March 31, 1925.
A. F. ROTH
1,531,980
CENTRIFUGAL FAN
Filed June 7, 1923
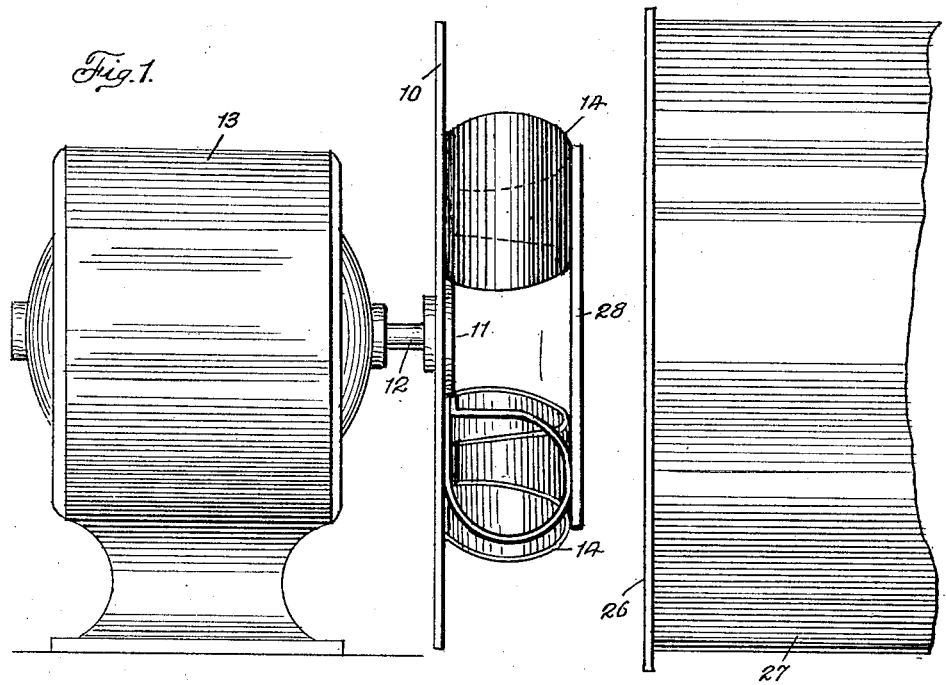
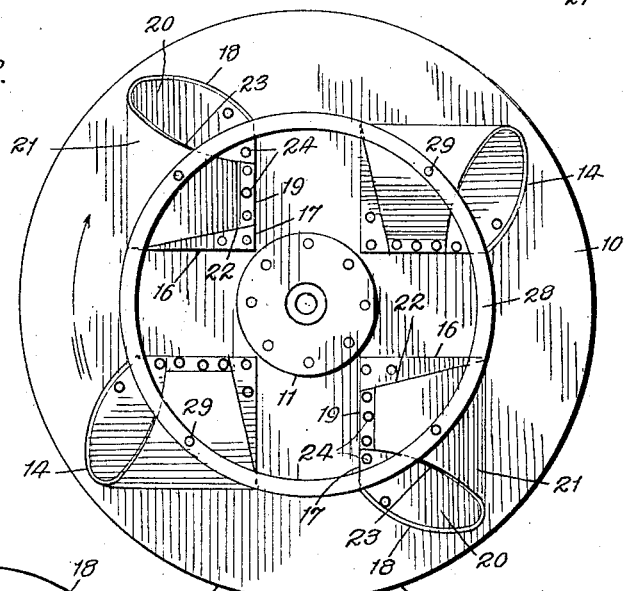
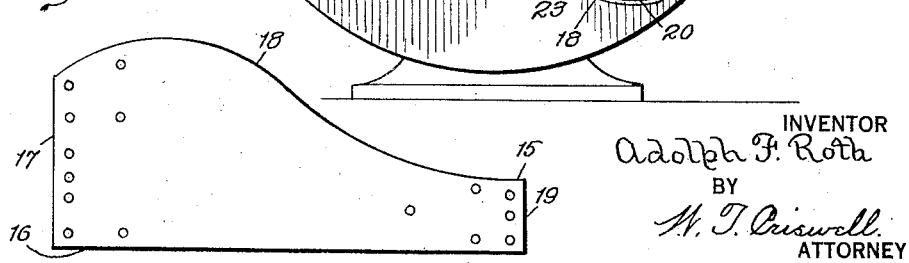
INVENTOR
Adolph F. Roth
BY
W. T. Criswell
ATTORNEY Patented Mar. 31, 1925.

1,531,980

UNITED STATES PATENT OFFICE.

ADOLPH F. ROTH, OF NEWARK, NEW JERSEY.

CENTRIFUGAL FAN.

Application filed June 7, 1923. Serial No. 643,951.

*To all whom it may concern:*

Be it known that I, ADOLPH F. ROTH, a citizen of the United States, and a resident of Newark, in the county of Essex and State of New Jersey, have invented certain new and useful Improvements in a Centrifugal Fan, of which the following is a full, clear, and exact specification.

This invention relates to a class of air circulating devices, and is a modified form of the fan disclosed in my pending application for a patent, Sr. No. 642,522, filed May 31, 1923.

My invention has for its object primarily to provide a fan of a form adapted to be used as a ventilating device for suctionally exhausting currents of air, or as a rotary fan for circulating air for cooling purposes and for circulating hot radiated air for heating purposes, in order to maintain healthful atmospheric conditions in factories, restaurants, buildings, cars, boats and other places wherein the air is susceptible of being charged with excessive heat, smoke, fumes or other impurities, and which may be driven by suitable power or operated as a wind motor or air blower.

The invention consists mainly of a surface element or flat disk having a hub for serving as a baffle and protector, and fixed on one face of the disk are spaced corresponding air-suction members or blades disposed radially with relation to the hub portion. Each of the blades is of a form having surfaces curved substantially similar to the curvature of the surfaces of a tube or cone, and the blades are relatively arranged whereby the axes of the tubular or conical blades are substantially tangential to the hub portion of the baffle disk so that when the fan is centrifugally driven the blades will suctionally attract currents of the air in the field of the fan in a manner whereby the air will be admitted in one of the open ends of the blades for discharge through the other end of the blades in spirally driven currents which in turn will tend to prevent static aerial pressure at the center of the hub portion of the baffle disk.

A further object of the invention is to provide a centrifugal fan of a simple, efficient and durable construction which may be made in any suitable size and shape.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a fragmentary view showing a side elevation of one form of my improved fan applied to an electric motor and which shows its use as an exhausting fan.

Fig. 2 is a front elevation of the fan, and

Fig. 3 is a plan of the blank from which each of the blades of the fan may be made.

The fan has a surface element or flat disk 10 which may be of any suitable size and shape, though the form of the disk illustrated is circular for serving as a baffle and protector, as will be hereinafter more fully explained. In the central part of the disk 10 is a hub portion 11, and this hub portion may be keyed or otherwise secured on the shaft, as 12, adapted to be driven by any appropriate power, such as an electrically operated motor, as 13, or instead of the motor I may provide on the shaft a second fan, not shown, which may be driven by currents of wind.

On the face of the baffle surface element or disk 10 surrounding the hub portion 11 are a number of spaced air-suction members or blades 14 all of which are preferably of similar formations, and the blades are radially disposed relative to the hub portion. Each of the blades 10 may be formed from a blank, as 15, of pliable sheet metal of approximately a triangular shape to provide rightangled straight edges 16, 17, and the inclined edge of each blank may be convexly curved, as at 18, while one of the corner portions of each of the blanks is cutaway transversely to provide a straight edge, as 19. Each of the blades 10 is formed from one of the blanks 15 by bending or curling the blank centrally crosswise so that the straight edge part 19 of the blank overlaps the central portion of the straight edge 17 of the blank. By forming each blank in this fashion each of the blades 10 have curved surfaces as 20, 21, corresponding approximately to the curvature of a tube or split tube or cone, and substantially one-half of the edges of the open ends of each blade is tapered as at 22, 23, toward the center of the length of the blade.

The curved surfaces 20, 21 of the blades obviously serve to overcome tendency to imposition thereon of resistance from air pressure when the fan is operated, and all of the blades are secured on the disk by riveting, as at 24, or otherwise fixing the overlapping edge parts of the blades to the disk so that the parts of the blades having the rightangled edges 16, 17 laps upon the disk. The tapered parts 22, 23 of the blades are thereby spaced from the disk, and all of the blades, as shown, are also arranged whereby their rightangled edges are in spaced parallel cruciform arrangement relative to the hub portion of the disk with their axes being tangential to the hub portion.

In the drawing is illustrated the device as employed as an exhaust fan, which is positioned with the air-suction elements or blades and the baffle disk 10 in spaced opposition to outlet end, as 26, of a tubular casing or hood or flue, as 27, which may lead from the interior of a factory, building, car, boat or elsewhere for maintaining proper atmospheric conditions therein, and the motor 13 may be suitably supported when operated for driving the fan. The circumference of the disk may be greater than the diameter of the flue or casing 27 for shielding the parts of the motor from contact with the currents of air generated by the blades, especially when the fan is used for exhausting air charged with smoke, acid fumes or other substances liable to corrode or clog the parts of the motor. When the fan is driven the air currents will tend to be suctionally attracted against the hub portion of the disk 10 which will serve as a baffle, and the air will be admitted in spiral currents into the inner ends of the blades for passage therethrough and discharge from the outer ends of the blades. The liability of the presence of all static air pressure at the hub portion of the disk will thereby be overcome, and serving as means to prevent the blades from warping from their normal shapes under the pressure of the air current on the outermost faces of the blades is a ring or band 28 which is riveted or otherwise secured, as at 29, to each of the blades. Thus a simple, efficient and durable fan is provided for exhausting or circulating air or for use as an air blower whereby healthful atmospheric conditions may be maintained in factories, restaurants, buildings, cars, boats and elsewhere.

While in the foregoing description, I have embodied the preferred form of my invention, I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A centrifugal fan, comprising a baffle surface element with a hub portion, a plurality of spaced air-suction members fixed on one face of the element surrounding the hub portion, each of said members formed with curved surfaces approximately similar to the curvature of a tube and the members being disposed radially relative to the hub portion of the surface element whereby the axes of said members are substantially tangential to the hub portion, the outer parts of the edges of the ends of each member being tapered toward the center of the length of the member as well as toward the hub portion, and means connecting together the outer faces of the air-suction members.

2. A centrifugal fan, comprising a baffle surface element with a hub portion, a plurality of spaced air-suction members on one surface of the element surrounding the hub portion, each of said members having a wall curved approximately similar to the curvature of a slitted tube and the edges of the slits of the members being fastened to the surface element whereby the members are disposed radially relative to the hub portion with their axes substantially tangential to the hub portion.

3. A centrifugal fan, comprising a baffle surface element with a hub portion, and a plurality of spaced air-suction members on one surface of the element surrounding the hub portion, each of said members having a wall curved approximately similar to the curvature of a slitted tube and the edges of the slits of the members being fastened to the surface element whereby the members are disposed radially relative to the hub portion with their axes substantially tangential to the hub portion, the outer parts of the edges of the open ends of each member being tapered toward the center of the edge of this part of the slit, and means connecting together the outer faces of the air-suction members.

4. A centrifugal fan, comprising a disk with a hub portion, and a plurality of spaced blades fixed on one face of the disk surrounding the hub portion, each blade formed of a substantially triangular blank transversely curved in approximately a cone-shape with one of its corner portions overlapping the central part of the unbent straight edge of the blank and the overlapping edge parts of all the blades being fastened to the disk whereby the blades are disposed radially relative to the hub portion with their axes substantially tangential to the hub portion.

5. A centrifugal fan, comprising a disk with a hub portion, a plurality of spaced blades fixed on one face of the disk surrounding the hub portion, each blade formed of a substantially triangular blank transversely curved in approximately a cone-shape with one of its corner portions overlapping the central part of the unbent straight edge of the blank so that parts of the edges of the open ends of the blade are on converging inclines and the overlapping edge parts of all the blades being fastened to the disks whereby the blades are disposed radially to the hub portion with their axes substantially tangential to the hub portion and with the inclined edge parts of the open ends in spaced relation to the disk, and a band element connecting together the outer faces of the blades.

6. In a ventilating system having a tubular casing for exhaust air, an electric motor with its drive shaft disposed toward the passage of the casing, a baffle surface element with a hub portion held on the drive shaft of the motor between the casing and the motor, and air-suction members on the face of the baffle element and between the element and the casing, each of said members having a wall curved approximately similar to the curvature of a slitted tube and all of the members disposed with their axes tangential to the hub portion, said baffle surface element being of a dimension for protecting the motor from contact with the air suctionally exhausted through the casing.

7. In a ventilating system having a tubular casing for exhaust air, an electric motor with its drive shaft disposed toward the passage of the casing, a baffle surface element held on the drive shaft of the motor between the casing and the motor, and air-suction members on the face of the baffle element opposed to the tubular casing, each of said members formed of a substantially triangular blank transversely curved in approximately a cone-shape and all of the members disposed with their axes tangential to the hub-portion, said baffle surface element being of a larger dimension than the maximum dimension transversely of the motor.

This specification signed and witnessed this 6th day of June A. D. 1923.

ADOLPH F. ROTH.

Witnesses:
A. WASHIN,
J. FREDERICK CRYER.